United States Patent [19]

Nicodemo

[11] 4,145,873

[45] Mar. 27, 1979

[54] TIMING DEVICE FOR ACCUMULATING A TELEPHONE LONG DISTANCE CALL CHARGE

[76] Inventor: Gino L. Nicodemo, 681 Moland St., Sudbury, Ontario, Canada, P3C 1L6

[21] Appl. No.: 784,952

[22] Filed: Apr. 5, 1977

[30] Foreign Application Priority Data

Apr. 14, 1976 [CA] Canada .................................. 250292

[51] Int. Cl.² ...................... G04B 47/06; G04C 23/06; G07C 1/00
[52] U.S. Cl. ............................. 58/152 R; 58/152 T; 58/23 R; 58/39.5; 58/57; 58/74
[58] Field of Search ............ 58/145 K, 152 R, 152 B, 58/152 T, 23 R, 23 D, 39.5, 57, 74

[56] References Cited

U.S. PATENT DOCUMENTS 2,629,781  2/1953  Feinstein ...................... 58/152 T X
3,018,613  1/1962  Jaccard ........................ 58/152 T X

*Primary Examiner*—Stanley J. Witkowski
*Attorney, Agent, or Firm*—George H. Riches

[57] ABSTRACT

A timing device for accumulating a telephone long distance call charge. It is basically a modified stopwatch, and must be used in conjunction with a push-button calculator incorporating the "automatic constant" function. The stopwatch has been altered so that a specially-designed piece of plastic or metal, replacing the second hand, forces a pin through the bottom of the casing, once per revoluton (i.e. once a minute). This pin depresses the "automatic constant" key, thereby adding the pre-programmed cost of the call for that minute to a running sub-total. A spring brings the pin back to its original position, and the cycle is repeated, unless stopped.

7 Claims, 7 Drawing Figures

FIGURE 1
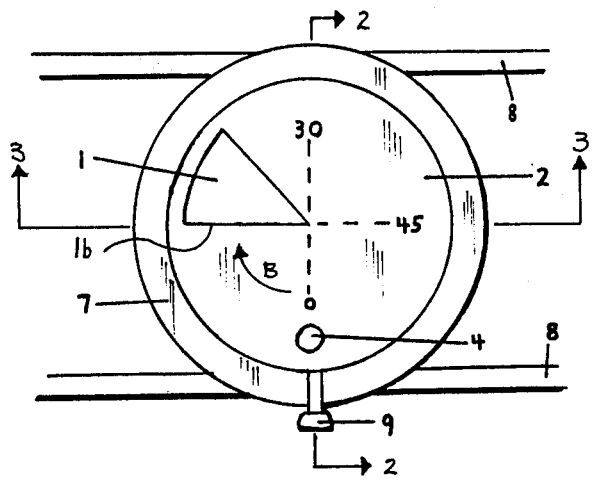
FIGURE 2
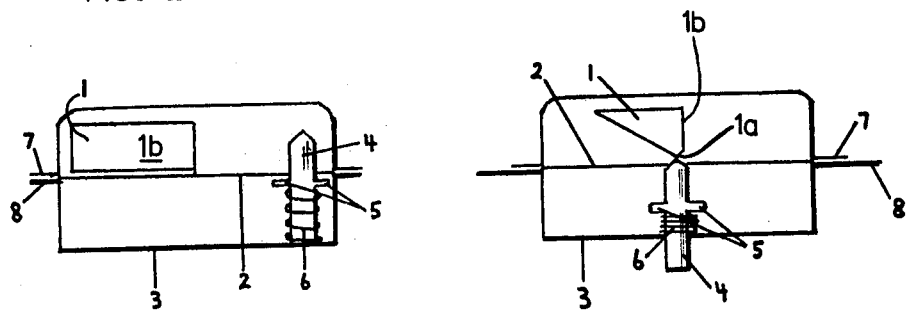
FIGURE 3
FIGURE 4
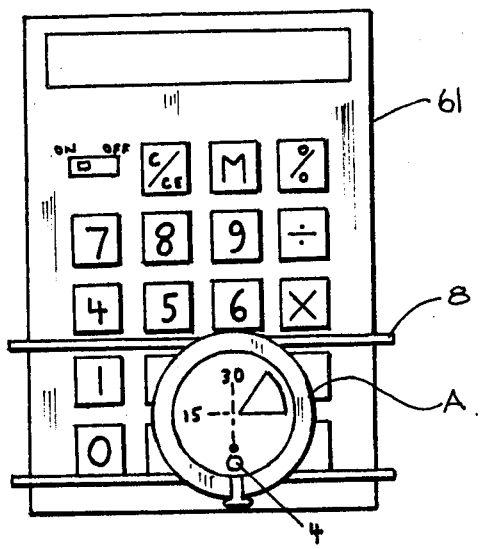

PRIOR ART

TIMING DEVICE FOR ACCUMULATING A TELEPHONE LONG DISTANCE CALL CHARGE

This invention relates to a method for providing an immediate and continuous account of the cost of a long-distance telephone call, when the charges for such a call are set on a per-minute basis.

The three ways in which this can currently be done are either impractical, inflexible or overly expensive. One can personally add the per-minute charge to the sub-total on the expiry of each minute, but this is most inconvenient and distracting, as it requires one to keep a constant watch on the time. One could print the various cumulative charges on a clock face and allow the minute hand to indicate the cost as it builds us, e.g. one minute—20¢, two minutes—40¢, etc., but the limited space available on the clock face plus the complexities of the long-distance telephone call rate structure (which is, also always subject to change) would place limitations on the flexibility and scope of such a system, e.g. one would be limited to phone calls of sixty minutes' duration. Electronic calculators *have* been devised with a built-in timing function, but the cost of one will, at present, range from a few hundred to thousands of dollars.

My invention, on the other hand, is simple, cheap, practical, flexible, and accurate. All it really consists of is the mechanism controlling the movement of a watch's second hand, with some means of starting, stopping and re-setting this mechanism. Once the mechanism is started, a modified second hand pushes a pin through the bottom of the watch's casing once a minute, forcing it to depress the "automatic constant" key on a push-button, electronic digital calculator held immediately beneath the watch, said key having been pre-set to add the per-minute charge for the phone call, to the sub-total. A spring then returns the pin to its original position, and the cycle is repeated, until stopped the mechanism and calculator can then be re-set. The advantages of this invention are that the costs of its manufacture and repair should be very low, it requires only an initial programming of the calculator and then functions on its own, and it can be used with *any* "pocket-size" calculator, provided such a calculator has an "automatic constant". The device could also be used as an ordinary watch or stopwatch, depending on its design.

In drawings which illustrate embodiments of the invention,

FIG. 1 is a top plan view of one embodiment,

FIG. 2 is a lateral view of this embodiment, viewed across the "30-60" axis of FIG. 1, FIG. 3 is a lateral view of this embodiment, viewed across the "15-45" axis of FIG. 1, and FIG. 4 is a top plan view of the invention as it might appear while in use.

Figure 5:
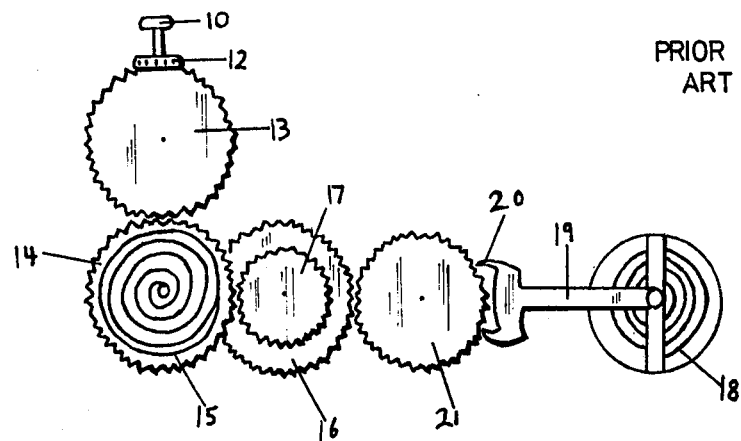
Figure 6:
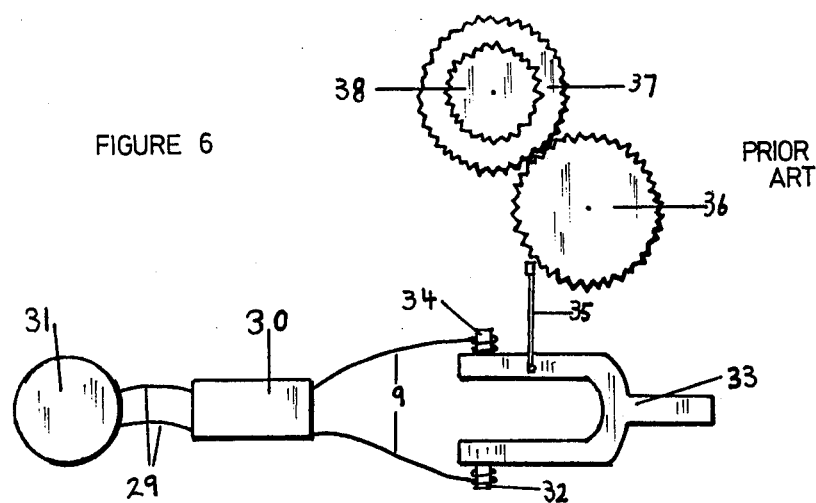
Figure 7:
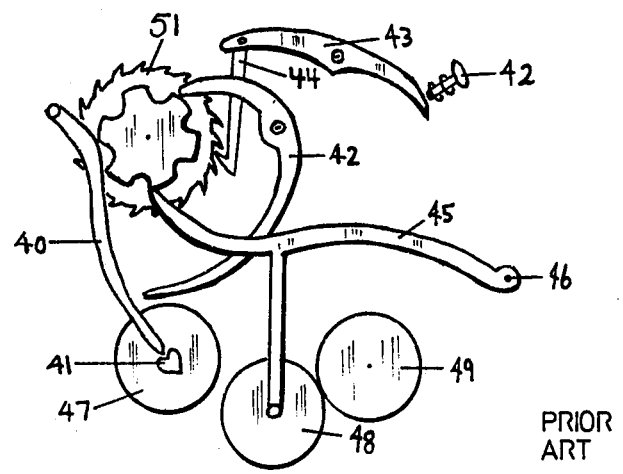

In drawings which illustrate the mechanisms governing the actual movement of the invention, FIG. 5 is a top plan view of the mechanism controlling the movement of the (modified) second hand in an ordinary watch, stop-watch or chronograph, when such a mechanism is powered by a main-spring, FIG. 6 is a top plan view of the mechanism governing movement of the second hand in either an ordinary watch, chronograph or stopwatch, where the energy is supplied by a battery, and FIG. 7 is a top plan view of the mechanism governing the starting, stopping and re-setting of the split second hand in a chronograph.

In essence, the invention consists of a timing mechanism A controlling the movement of a watch's second hand, with some means of starting, stopping and re-setting this mechanism, with a few additions to this mechanism. The drawings illustrate the invention as it might appear while utilizing such a mechanism as contained in a stopwatch.

FIG. 1 shows one embodiment of the present invention where a modified stopwatch is used as the timing mechanism A. This timing mechanism will be used to indicate the passing of one minute intervals. This embodiment comprises replacing the second hand of the watch with an actuating means 1. The means is pivotally connected to one end to the centre of the watch as would the hand of any watch. In the most preferred embodiment the actuating means 1 defines an arc of about 45° forward in the direction of arrow B from the trailing edge 1b of the means 1. The forward underside of the actuating means 1 is inclined upwardly from the lowermost ledge 1a near and parallel to the trailing edge 1b. The actuating means is also slightly inclined from the ledge 1a backwardly to the trailing edge 1b in this embodiment.

In FIG. 1, the ledge 1a is shown at the "15 second" mark of the timing mechanism A. The ledge 1a would likely be reset at the beginning of each telephone call at the "0 second" or "60 second" mark. The reference to a number of "seconds" is made in view of the fact that in this embodiment the time to complete one cycle is 60 seconds; therefore "15 seconds" is a quarter cycle, "30 seconds" a half cycle, etc.

FIG. 2 is then a side view along the "30-60 second" line of FIG. 1 with the ledge 1a at the "30 second" mark. FIG. 3 is a side view along the "15-45 second" line of FIG. 1 with the ledge 1a at the "60 second" mark. From FIGS. 1–3 one can therefore view the preferred actuating means 1 from three different views.

When the actuating means 1 is started, it rotates about the centre of the timing mechanism A from a position where the ledge 1a is adjacent, but past, the pin 4. Upon completing the time period of the rotation, one minute when a modified watch is being used, the underside of the actuating means 1 will come into contact with the pin 4 and force it downwardly, as shown in FIG. 3. The advantage of the inclined underside of the actuating means 1 is that the pin 4 will be easily and gently depressed by this structure.

The height of the pin 4 must be less than the height of the upper surface of the actuating means 1 to ensure that the pin will be urged downward by the means 1. The pin 4 must be depressed by the actuating means 1 that amount necessary so that the pin 4 will contact the "automatic constant" key on the calculator 61 when depressed.

Between the face 2 and the back 3 the pin 4 will have two protruding arms 5, extended perpendicular to the pin's length. Beneath these arms will be a spring 6, large enough in diameter to allow the pin 4 to move freely up and down within it and to maintain itself within the casing, but small enough to be pulled down by the arms on the pin. Its strength should be just sufficient to allow it to raise the pin 4 to its original level of rest, after compression.

The stop-start-wind knob 9 is of the pushbutton type commonly found on stopwatches.

Running laterally around the watch at its midpoint will be a thin, flat metal or plastic ring 7. It will be supported by two metal or plastic strips 8 extending beyond either side of the calculator and elevated above the calculator sufficiently to allow the effect functioning of the device. The ring 7 will not be fixed rigidly to the strips 8, but will be capable of being readily slid along these strips 8.

As for the mechanisms governing the actual movement of the invention, in FIG. 5:

The crown 10 is wound by hand, and the power is transmitted via the winding pinion 12, the crown wheel 13, and the ratchet wheel 14 to the mainspring 15. Through a number of toothed wheels similar to 16 the energy released by the unwinding of the mainspring 15 is gradually transmitted to the second wheel 17. This release is controlled by the action of the hair spring 18 on the pallet 19 to the pallet stone 20, thence the escape wheel 21 and in turn back to the gear train 16.

In FIG. 6:

The battery 31 feeds electricity via wires 29 through an electronic circuit 30 to a drive coil 32 on one tine of a tuning fork 33, which attracts a permanent magnet 34 on the other tine and sets the fork 33 to vibrating. The vibrating tine to which the magnet 34 is attached to pulls and pushes the index finger 35 back and forth, which causes the index wheel 36 to rotate, which movement is passed through the gear train 37 to the second wheel 38. The amount of electricity sent through the wires 39 is controlled by the electronic circuit 30. The circuit 30 is of a standard type commonly used in battery-powered watches.

In FIG. 7:

Parts 45, 40 and 42 are held against part 51 by springs which, for the sake of simplicity, have not been illustrated. The ratchet wheel 51 has six posts and eighteen teeth. The first time push piece 42 is depressed, operating lever 43 and pawl 44 move the ratchet wheel 51 up one notch; this results in transmission lever 45 rotating about its pivot 46 until wheels 47, 48 and 49 (all containing very fine teeth) are in gear. Simultaneously, zero lever 40 moves away from cam 41, freeing wheel 47; as wheels 47 and 49 are of the same diameter and wheel 49, which is connected to the sweep second hand, rotates once every sixty seconds, then wheel 47, which is connected to the split second hand, will do likewise. A second depression of push piece 44 causes brake lever 42 to swing out and stop wheel 47; simultaneously, lever 45 will take wheel 48 out of gear with wheel 47. A third push on part 44 will cause lever 40 to push back onto cam 41 until it bears into the lowest point of the heart-shaped cam 41, at which time the split second hand and the mechanism are again at rest. The mechanism controlling the starting, stopping and re-setting of a stopwatch is similar to that found in a chronograph, with the diference that the mechanism acts directly on the wheel attached to the sweep second hand.

The invention is to be operated in the following manner (see FIGS. 1, 2, 3 and 4):

The calculator 61 is turned on and cleared. One then determines the rate per minute for the particular telephone call and inserts this initial amount into the calculator. The calculator must be one which has what is known as an "automatic constant" key. This key, when depressed, will add to the total showing at any time on the calculator the initial amount. The timing mechanism A is then positioned atop the calculator so that the pin 4 is directly above the automatic constant key.

When the call is commenced, then the stop-start knob 9 is activated and the timing mechanism is started. The actuating means 1, which is set to complete one entire circuit before contacting the pin 4, is thereby started. Since the actuating means is a replacement for the second hand of the watch, it will rotate once a minute. Therefore, as the second minute of the call is entered, the actuating means 1 will come into contact with the pin 4 and force it downwards where it will depress the automatic constant key on the calculator 61. This adds to the total showing on the calculator the cost of another minute. Once the actuating means passes over the pin 4, the pin 4 is returned to its original position by spring 6. The cycle then repeates itself.

The present invention so times the number of complete minutes, and uncompleted portion if any, of the telephone call and automatically reads out the total cost at the end.

If the time period by which charges are made are not equal to one minute periods, then a timing mechanism can obviously be constructed to register such periods and, by using the present invention, calculate the cost of the calls. This invention also obviously need not be restricted to the monitoring of the cost of telephone calls. Any event which has a fixed cost per fixed time period can make use of this invention as specifically defined in the preferred embodiment or in a slight modification thereof.

The embodiments of the invention in which an exclusive property or privilege is claimed are defined as follows:

1. A device for the continuous monitoring of the increasing cost of an event with a fixed cost per time unit, useable with a calculator programmable so that when a single button on the calculator is depressed a first amount equal to the fixed cost will be added to a second amount equal to the increasing cost, comprising a timing mechanism employing a periodically rotating actuating means, the actuating means having a surface inclined downwardly and rearwardly facing the direction of rotation which is about a centrally located point on an upper surface of the timing mechanism, said calculator being located beneath the timing mechanism, a pin means located in the timing mechanism and extendable therethrough to therebeneath which may be vertically depressed once by the actuating means during a single rotation of the actuating means, said pin means when depressed extending through the timing mechanism to depress the button on the calculator, spring means to return the pin means from the depressed position once the actuating means has rotated past the pin means, and resetting means to stop, start and reset the timing device.

2. A device as defined in claim 1, where the mechanism is that governing the movement of the second handn in a mainspring-powered watch.

3. A device as defined in claim 1 wherein the mechanism is that governing the movement of the second hand in an electricity-powered watch.

4. A device as defined in claim 1, where the mechanism is that governing the movement of the second hand in a mainspring-powered stopwatch.

5. A device as defined in claim 1, where the mechanism is that governing the movement of the second hand in an electricity-powered stopwatch.

6. A device as defined in claim 1, where the mechanism is that governing the movement of the split second hand in a mainspringed-powered chronograph.

7. A device as defined in claim 1, where the mechanism is that governing the movement of the split second hand in an electricity-powered chronograph.

* * * * *